350-96.3 SR
5/19/87 XR 4,665,660

United States Patent [19]

Jablonski et al.

[11] Patent Number: 4,665,660

[45] Date of Patent: May 19, 1987

[54] MILLIMETER WAVELENGTH DIELECTRIC WAVEGUIDE HAVING INCREASED POWER OUTPUT AND A METHOD OF MAKING SAME

[75] Inventors: Daniel G. Jablonski, Silver Spring; Albert D. Krall, Rockville, both of Md.

[73] Assignee: The United States of America as represented by the Secretary of the Navy, Washington, D.C.

[21] Appl. No.: 746,483

[22] Filed: Jun. 19, 1985

[51] Int. Cl.[4] .................... B24B 37/19; H01Q 17/00; G02B 6/10

[52] U.S. Cl. .................................... 51/281 R; 29/600; 350/96.3

[58] Field of Search ................. 51/281 R, 289 R, 290; 333/239, 240, 241, 242, 248; 29/600; 350/96.3

[56] References Cited

U.S. PATENT DOCUMENTS

| | | | |
|---|---|---|---|
| 3,619,795 | 11/1971 | Marcatili | 330/4.6 |
| 3,825,998 | 7/1974 | Oberbeck | 29/600 |
| 3,969,016 | 7/1976 | Kaiser et al. | 350/96.3 |
| 4,463,329 | 7/1984 | Suzuki | 333/239 |
| 4,463,330 | 7/1984 | Yoneyama | 333/329 |

*Primary Examiner*—Frederick R. Schmidt
*Assistant Examiner*—Maurina Rachuba
*Attorney, Agent, or Firm*—Kenneth E. Walden; Frederick A. Wein; John G. Wynn

[57] ABSTRACT

A millimeter wavelength solid dielectric waveguide having either an undulating or roughened outer surface is disclosed. As configured, and properly designed, for the wavelength of interest, the non-cylindrical surface will not have any deleterious effects on the electromagnetic properties of the dielectric waveguide. Moreover, the novel surface treatment will greatly increase the amount of heat energy that can be dissipated by radiation and convection from the dielectric waveguide thereby increasing its power handling capability.

8 Claims, 4 Drawing Figures

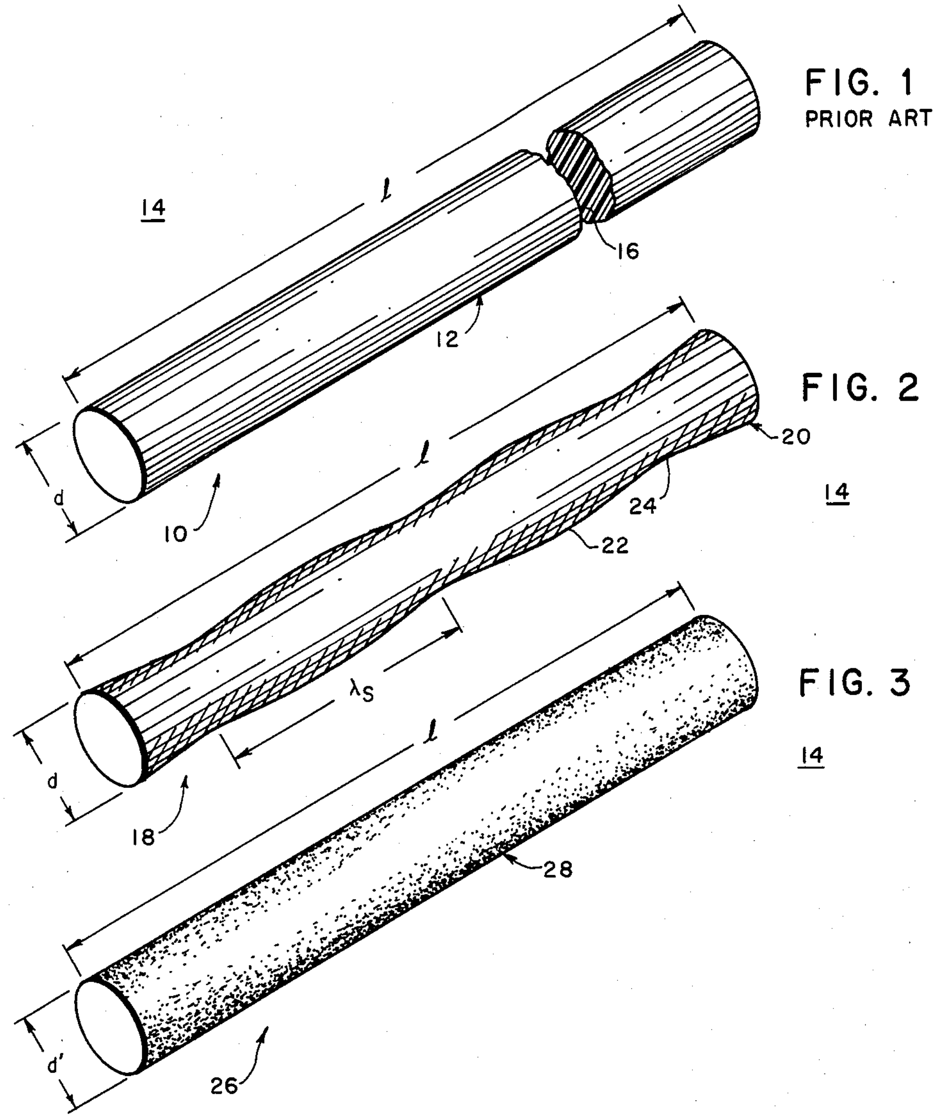
FIG. 1
PRIOR ART
FIG. 2
FIG. 3
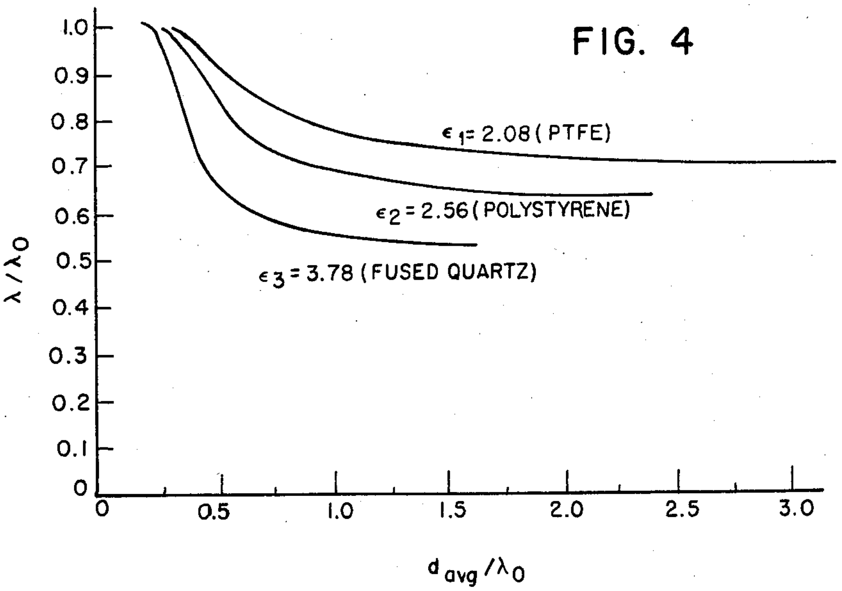
FIG. 4

MILLIMETER WAVELENGTH DIELECTRIC WAVEGUIDE HAVING INCREASED POWER OUTPUT AND A METHOD OF MAKING SAME

BACKGROUND OF THE INVENTION

1. Field of the Invention

The present invention relates to solid circular dielectric waveguides, but in particular, the present invention relates to a method of increasing the power output of a solid circular dielectric waveguide without substantially effecting its electromagnetic properties.

2. Description of the Prior Art

The present invention is concerned with circular dielectric waveguides for use at millimeter wavelengths [1], [2]. Typical values of wavelength are 1 to 10 mm, with corresponding frequencies between 300 and 30 GHz. The waveguides in question are typically dielectric cylinders a few millimeters in diameter. Typical materials are polytetrafluoroethylene (PTFE) (which is also known as "TEFLON", a trademark of the E.I. du Pont de Nemours & Company, Inc.), polystyrene, and fused quartz.

The waveguides are typically operated in a "single hybrid mode" situation in which only one electromagnetic mode can propagate. This dominant mode is known as the $HE_{11}$ mode. To ensure single mode operation, the diameter of the waveguide must be kept below a certain critical value which depends on the frequency of the guided wave and the dielectric constant of the guide.

Dielectric waveguides have traditionally been made to have very smooth surfaces in order to eliminate the possibility of radiating electromagnetic signals in an undesirable fashion. However, Marcuse [3] and Marcuse, et al [4] have shown that there are situations were imperfections do not result in undesirable radiation. Consequently, there has been considerable study of the electromagnetic properties of dielectric waveguides; however, there has been little mention in the prior art of the power-handling capabilities of dielectric waveguides. This is not surprising, as dielectric waveguides are primarily of interest at millimeter wavelengths, where levels of available power are rather low. In the recent past and at the present time, the amount of activity aimed at developing high-power millimeter wavelength sources has increased. Thus, there is a need in the prior art to increase the power-handling capability of circular dielectric waveguides without substantially effecting their normal electromagnetic properties and operation.

The prior art, as indicated hereinabove, includes some progress in the study and implementation of solid circular dielectric waveguides. However, insofar as can be determined, no prior art dielectric waveguide or method incorporates all of the features and advantages of the present invention.

OBJECTS OF THE INVENTION

Accordingly, a principal object of the present invention is to increase the power handling capability of a circular dielectric waveguide operating in the millimeter-wave spectrum in an improved manner.

Another object of the present invention is to carry-out the foregoing object by substantially increasing the amount of heat energy due to dielectric heating that can be dissipated from the circular dielectric waveguide by radiation and convection.

Yet another object of the present invention is to accomplish the above mentioned object by increasing the effective surface area of the circular dielectric waveguide while substantially maintaining its circular configuration.

Still another object of the present invention is to increase the effective surface area of a circular dielectric waveguide by either roughening or undulating its surface, but yet not have any deleterious effect on its microwave and electromagnetic properties.

SUMMARY OF THE INVENTION

In accordance with the above stated objects, other objects, features and advantages, the primary purpose of the present invention is to improve the basic design of circular dielectric waveguides to permit a substantial increase in the amount of power that they can transmit, in the millimeter-wave spectrum.

The essence of the present invention is in configuring the circular dielectric waveguide to increase its effective surface area so as to dissipate more heat energy, due to dielectric heating, without interfering with its microwave or electromagnetic performance in the frequency range of interest, i.e., in the range of 300 GHz to 30 GHz with corresponding wavelengths of 1 to 10 mm.

The purpose of the present invention is carried-out, inter alia, by using a material having the proper dielectric constant for fabrication of the waveguide. In operation, the waveguide is disposed in a medium of dielectric constant $\epsilon_0$ which is usually air. Hence, $\epsilon_0$ will be equal to the free-space permittivity. Typical materials that can be used are polystyrene, fused quartz, and polytetrafluoroethylene (PTFE). In practice, the material used is fabricated in the form of a cylinder having a maximum diameter d less than a predetermined critical diameter $d_c$.

A technique for increasing the effective surface area of the waveguide is to introduce regular variations or undulations in the surface of the waveguide along its length. The undulations can be accomplished by machining the cylindrical waveguide on a lathe, for example. This technique can be successfully used with waveguides having diameters greater than 2 mm, and lengths in the range of several feet or less. The undulations machined in the surface of the waveguide are characterized by crests or valleys of wavelength $\lambda_s$. These, crests and/or valleys are formed according to predetermined equations.

A technique for increasing the effective surface area of the waveguide when its diameter is less than 2 mm and/or its length is greater than several feet is to introduce random or pseudorandom variations in the surface of the waveguide along its length. This can be accomplished by scuffing the surface of the waveguide with an abrasive agent such as sandpaper, for example. Depending on the grain size of the sandpaper, for example, the surface finish can be made to have a reasonably well defined "correlation length" $\lambda'_s$ which is used to statistically calculate the expected radiation loss of the finished waveguide.

BRIEF DESCRIPTION OF THE DRAWINGS

The foregoing, other objects, novel features and advantages of the present invention will be more apparent from the following more particular description of the preferred embodiments as illustrated in the accompanying drawings, in which:

FIG. 1 depicts a section of a conventional solid circular dielectric waveguide comprising a cylinder of diameter d having a dielectric constant $\epsilon_1$ embedded in a medium of dielectric constant $\epsilon_0$;

FIG. 2 illustrates an improved version of the conventional solid circular dielectric waveguide of FIG. 1 showing, inter alia, its surface characterized by undulations of ridges and/or valleys (not to scale) formed according to predetermined equations so as to increase the effective surface area thereof so as to increase heat dissipation without substantially altering its electromagnetic properties in the frequency range of interest, according to the present invention;

FIG. 3 shows another version of the improved solid circular dielectric waveguide of FIG. 2 depicting, inter alia, its surface characterized by random or pseudorandom undulations or variations formed according to other predetermined equations so as to increase the effective surface area thereof so as to increase heat dissipation without having any deleterious effect on the electromagnetic properties in the frequency range of interest, according to the present invention; and FIG. 4 is a graph of the propagation characteristics of the $HE_{11}$ mode of conventional solid dielectric waveguides like that of FIG. 1 to be used in configuring the improved waveguides of FIGS. 2 and 3, according to the present invention.

DESCRIPTION OF THE PREFERRED EMBODIMENTS

FIG. 1 shows a conventional cylindrical dielectric waveguide 10 of diameter d and length l. In the traditional fashion, the conventional cylindrical dielectric waveguide 10 has a smooth outer surface 12. The conventional waveguide 10 is shown surrounded by a medium 14 having a dielectric constant $\epsilon_0$. For the purposes of the present invention, the medium 14 can be air so that $\epsilon_0$ will usually be equal to the free-space permittivity. To continue, typical material 16 that can be used to fabricate the conventional waveguide 10 are polystyrene, fused quartz, and polytetrafluoroethylene (PTFE, trademark "TEFLON"). It was generally thought that a smooth outer surface 12 was necessary for propagation of electromagnetic signal down the "guide" in a desirable fashion until the work of Marcuse [3] and Marcuse et al. [4] proved otherwise under certain conditions and constraints. In addition, Jablonski [1] recognized that given the amount of activity aimed at developing high-power millimeter wavelength sources there was soon to be a need for work defining a "guide" that permitted an increase in the amount of power that could be transmitted, but yet not have any deleterious effect on the "guide's" electromagnetic properties in the frequency range of interest, i.e., 30 to 300 GHz. FIGS. 2 and 3 disclose "guides" employing the foregoing notion(s) and encompassing the present invention.

Referring then to FIG. 2, an improved dielectric waveguide 18 of maximum diameter d and length l is shown. It is also surrounded by a medium 14 having a dielectric constant $\epsilon_0$. However, as shown, the improved waveguide 18 is noncylindrical and has an undulating outer surface 20. The undulating outer surface 20 is well defined by predetermined equations (see the section "Statement of the Operation", thereintofollow) and includes a plurality of ridges 22 and a plurality of interspaced adjacent valleys 24. The ridges 22 and/or the valleys 24 are characterized by a surface wavelenth $\lambda_s$. Also, as depicted in FIG. 2, the diameter of the ridges 22 is the same as the maximum diameter d of the improved waveguide 18. Thus, for purposes of the present invention, $\Delta d/2$ is the depth of any one of the valleys 24. Therefore, $d-\Delta d$ is the minimum diameter of the "guide".

FIG. 3 shows another embodiment of the present invention, which is an improved dielectric waveguide 26 of maximum diameter d' and length l. The improved waveguide 26 is also surrounded by a medium 14 of dielectric constant $\epsilon_0$ and has a roughened outer surface of random or pseudorandom variations 28 having a reasonably well defined "correlation length". For purposes of the present invention, the "correlation length" reflects an equivalent, average value of wavelength $\lambda'_s$ for a random surface. This aspect of the present invention will be discussed under the "Statement of the Operation" hereintofollow.

STATEMENT OF THE OPERATION

The present invention involves the manner in which undulations in the case of FIG. 2, and random or psuedorandom variations in the case of FIG. 3 are configured into a solid cylindrical dielectric waveguide to permit an increase in the amount of power that can be propagated down the "guide" due to an increase in the effective surface area. Thus, the increase in the effective surface area increases the heat energy that can be dissipated by radiation and convection without adversely effecting the "guide's" electromagnetic properties, in the frequency range of interest, aforementioned.

By way of a first example, refer to FIGS. 2 and 4, as viewed concurrently. One necessary inequality is that:

$$d<d_c$$

where d is the maximum diameter of the improved dielectric waveguide 18, $d_c$ is the critical diameter of a "guide" in the frequency range of interest in order for the dominant mode or $HE_{11}$ mode operation to take place. The critical diameter $d_c$ is:

$$d_c=2.405\ \lambda_0/\pi(\epsilon_r-1)^{\frac{1}{2}},$$

where $\lambda_0$ is the free-space wavelength of signal frequency f, and is as follows:

$$\lambda_0=c/f,$$

where c is the speed of light. In addition, $\pi$ is the number 3.1415 ... , $\epsilon_r$ is the relative dielectric constant, which is defined as the ratio of the dielectric constant of the material used for the "guide" and, for our example, the free-space permittivity.

For the improved dielectric waveguide 18 of FIG. 2, it has been found that the diameter d should satisfy the following inequality for proper operation in the frequency range of interest:

$$0.5\ d_c<d<0.9\ d_c.$$

For the situation of FIG. 2, the undulations can be machined into a "guide" of the material to be used, or an extruding process can be used. In any case, one way of modifying the diameter as a function of the position "z" along the length l of the improved dielectric waveguide 18 is to make the diameter vary as:

$$d(z)=d_{avg}+(\Delta d/2)(\sin 2\pi z/\lambda_s),$$

where $d_{avg}$ is the average diameter of the "guide" after it is machined or extruded, and is, $d_{avg}=d-\Delta d/2$. To reiterate, in the above equation, $d-\Delta d$ is the minimum diameter of the improved waveguide 18 at any one of the valleys 24, z is the position along the improved waveguide 18, and $\lambda_s$ is the wavelength of undulations therein.

To continue, in order to prevent signal radiation from the improved waveguide 18, $\lambda_s$ must be chosen such that the following inequalities are observed:

$\lambda_s>(\lambda/\lambda_0)\lambda_0/[1-(\lambda/\lambda_0)]$ or $\lambda_s<(\lambda/\lambda_0)\lambda_0/[1+(\lambda/\lambda_0)]$, where $\lambda$ is the wavelength of the guided wave at a signal frequency f, and $\lambda/\lambda_0$ is obtained from FIG. 4. It should be noted that other nonsinusoidal surface profiles can be used. However, for the example here, let $d=0.6d_c$, the relative dielectric constant $\epsilon_r=\epsilon_1/\epsilon_0=2.08$ (e.g., a PTFE material) at a signal frequency f=70.0 GHz. Based on the foregoing, $\lambda_0=4.29$ mm and $d_c=3.24$ mm. Hence, d=2.0 mm, and the corresponding value for $\lambda/\lambda_0$ is 0.947. Thus, in order to prevent radiation, substitution in the above inequalities yields $\lambda_s>76.65$ mm or $\lambda_s<2.1$ mm. The first result will have minimal impact of the surface area of the "guide". The second result will have a significant effect. Thus, for a diameter $d_{avg}$ of 2.0 mm, the wavelength of the undulations, i.e., $\lambda_s$, should adhere to the following inequality:

$\lambda_s<2.1$ mm, and for $\lambda_s<2.1$ mm, minimal radiation of electromagnetic energy from the improved dielectric waveguide 18 is expected.

In order to optimize heat transfer from the improved dielectric waveguide 18 by radiation and convection, the depth of the valleys 24, i.e., $\Delta d/2$, needs to be approximately equal to the wavelength of the undulations, i.e., $\lambda_{s'}$; and to minimize reflections in the improved waveguide 18 due to impedance changes caused by discontinuities $d_{avg}$ should be of the order of 0.9 d. Consequently, to cover both of the foregoing situations, the following choices should be made:

$$\lambda_s\simeq 0.1\ d,\ \text{and}\ \Delta d\simeq 0.2\ d.$$

The embodiment of FIG. 3 is useful when the diameter d' is too small for reliable machining or extruding of the "guide". The smaller diameter is necessary for higher frequency operation, i.e., greater than 100 GHz. The embodiment of FIG. 3 is preferred, for example, when $$d'<2.0\ \text{mm}.$$

As previously mentioned, the "correlation length" of this "guide" reflects an equivalent, average value of wavelength $\lambda'_s$ for a random surface such as that of the improved waveguide 26. It has been found that introduction of the roughened outer surface of random or pseudorandom variations 28 having this well defined "correlation length", $\lambda'_s$, can be accomplished by using sandpaper for the abrading process. Using the foregoing guidelines, the grit size of the sandpaper in the range of 0.1 to 0.2 d' will give a "correlation length", $\lambda'_s$, within this same range.

Using the above principles and for dielectric waveguide lengths l of a few feet, i.e., less than 10 feet, the effective surface area of the "guide" can be increased without having a deleterious effect on its electromagnetic properties. By doing so, the ability of the "guide" to dissipate energy will be increased in direct proportion to the increase in surface area. As shown, for example in FIG. 2, the use of the undulating outer surface 20 of surface wavelength $\lambda_s$, and depth $\Delta d/2$ results in an increase in surface area and a proportional increase in the "guide's" power handling capability. In the case of a "guide" fabricated from PTFE, the increase in area can raise the power level from approximately 100 watts at 70 GHz for a maximum diameter d of 2.0 mm to a level of approximately 200 watts. In the case of polystyrene, comparable power levels will be an increase from about 6 watts to about 12 watts.

To those skilled in the art, many modifications and variations of the present invention are possible in light of the above teachings. It is therefore to be understood that the present invention can be practiced otherwise than as specifically described herein and still be within the scope of the spirit of the appended claims.

REFERENCES

[1] D. G. Jablonski, "Power Handling Capabilities of Circular Dielectric Waveguide at Millimeter Wavelengths," IEEE Trans. MTT, vol. 33, no. 2 pp. 85–89, February 1985.

[2] D. G. Jablonski, "Attenuation Characteristics of Circular Dielectric Waveguide at Millimeter Wavelengths," IEEE Trans. MTT, vol. 26, no. 9, pp. 667–671, September 1978.

[3] D. Marcuse, "Radiation Losses of Dielectric Waveguides in Terms of the Power Spectrum of the Wall Distortion Function," Bell Syst. Tech. J., vol. 48, no. 10, pp. 3233–3242, December 1969.

[4] D. Marcuse and R. M. Derosier, "Mode Conversion Caused by Diameter changes of a Round Dielectric Waveguide", Bell Sys. Tech. J.vol. 48, no. 10, pp. 3217–3232, December 1969.

What is claimed is:

1. A method of fabricating a solid dielectric waveguide configured to operate at a predetermined frequency within a predetermined range, so as to improve its power handling capability without deleteriously effecting its electromagnetic properties, comprising the steps of:

furnishing a cylindrical dielectric waveguide of a predetermined dielectric material, said cylindrical dielectric waveguide having a predetermined maximum diameter d, a length l and a smooth outer surface; and modifying the smooth outer surface of said cylindrical dielectic waveguide to conform to an undulating outer surface characterized by ridges and valleys, said ridges and valleys increasing the effective surface area of the waveguide and providing means for increasing the heat energy that can be dissipated in the waveguide without adversely effecting the waveguides electromagnetic properties in the frequency range of interest, said ridges and/or valleys being spaced according to a predetermined surface wavelength $\lambda_s$, and said ridges being at a predetermined maximum diameter d.

2. The method of claim 1 comprising the additional step of selecting the predetermined dielectric material from a group consisting of polytetraflouroethylene (PTFE), polystyrene and fused quartz.

3. The method of claim 2 comprising the additional step of choosing the predetermined maximum diameter d according to the inequality.

$d<d_c$, where $d_c$ is the critical diameter for dominant mode operation.

4. The method of claim 3 comprising the additional step of modifying the diameter of said cylindrical dielectric waveguide as a function of a position "z" along its length l according to the equation:

$d(z)=d_{avg}+(\Delta d/2)(\sin 2\pi z/\lambda_s)$, where $d_{avg}$ is the average diameter of said cylindrical dielectric waveguide after modifying, and is $d_{avg}=d-\Delta d/2$, where d is the predetermined maximum diameter and $\Delta d$ is the change in diameter between any one of said ridges and its adjacent valley, where $\pi$ is the number 3.1415 . . . , and $\lambda_s$ is the predetermined surface wavelength.

5. The method of claim 4 comprising the additional step of choosing the predetermined surface wavelength according to the inequality:

$\lambda_s<(\lambda/\lambda_0)\lambda_0/[1+(\lambda/\lambda_0)]$, where $\lambda$ is the wavelength of a signal frequency f being propagated along said cylindrical dielectric waveguide, and $\lambda_0$ is the wavelength of the same signal frequency in free-space.

6. The method of claim 5 wherein the predetemined frequency is in the range of 30 to 300 GHz.

7. The method of claim 1 wherein said modifying step is accomplished by machining.

8. The method of claim 1 wherein said modifying step is accomplished by rubbing the smooth outer surface of said cylindrical dielectric waveguide with an abrasive paper so as to create a roughened outer surface of random or psuedorandom variations.

* * * * *